(12) United States Patent
Kurebayashi (10) Patent No.: US 11,196,488 B2
(45) Date of Patent: Dec. 7, 2021

(54) PON SYSTEM AND COMMUNICATION CONTROL METHOD

(71) Applicant: NEC Platforms, Ltd., Kawasaki (JP)

(72) Inventor: Hiroki Kurebayashi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 545 days.

(21) Appl. No.: 16/093,306

(22) PCT Filed: Apr. 25, 2018

(86) PCT No.: PCT/JP2018/016720
§ 371 (c)(1),
(2) Date: Oct. 12, 2018

(87) PCT Pub. No.: WO2018/225414
PCT Pub. Date: Dec. 13, 2018

(65) Prior Publication Data
US 2021/0184770 A1    Jun. 17, 2021

(30) Foreign Application Priority Data

Jun. 9, 2017   (JP) .............................. JP2017-114078

(51) Int. Cl.
*H04Q 11/00* (2006.01)
*H04B 10/27* (2013.01)
(Continued)

(52) U.S. Cl.
CPC ......... *H04B 10/27* (2013.01); *H04L 12/2885* (2013.01); *H04M 11/04* (2013.01); *H04Q 11/0067* (2013.01)

(58) Field of Classification Search
CPC .... H04B 10/27; H04L 12/2885; H04M 11/04; H04Q 11/0067
See application file for complete search history.

(56) References Cited

U.S. PATENT DOCUMENTS

2005/0286893 A1* 12/2005 Horiuchi ............... H04W 64/00
                                                          398/71
2007/0230958 A1   10/2007 Jiang et al.
(Continued)

FOREIGN PATENT DOCUMENTS

CN   103596070 A   2/2014
CN   104041087 A   9/2014
(Continued)

OTHER PUBLICATIONS

Communication dated Sep. 8, 2020 from the China National Intellectual Property Administration in English application No. 201880001613.3.
(Continued)

*Primary Examiner* — Dzung D Tran
(74) *Attorney, Agent, or Firm* — Sughrue Mion, PLLC (57) ABSTRACT

To ensure the origination of an emergency call from a terminal device when a communication failure due to the continuous light-emission of an ONU occurs in a PON system, a PON system includes an OLT and a plurality of ONUs connected to the OLT through an optical branching device, where data is transmitted to the OLT by time-division multiplexing. The ONU includes an emergency call detection unit that detects an emergency call request from a telephone terminal, and an emergency call origination control unit that outputs, to the optical branching device, a disconnection request for disconnecting ONUs from the OLT when the emergency call request is detected and connection of the ONU to the OLT is not established. The optical branching device includes an optical line control unit that disconnects the ONUs from the OLT in response to the disconnection request.

11 Claims, 6 Drawing Sheets

(51) Int. Cl.
*H04L 12/28* (2006.01)
*H04M 11/04* (2006.01)

(56) References Cited

U.S. PATENT DOCUMENTS

| | | | | |
|---|---|---|---|---|
| 2008/0019268 A1* | 1/2008 | Rollins | ............... | H04L 69/40 370/229 |
| 2009/0268606 A1* | 10/2009 | DeLew | ............... | H04L 41/0663 370/216 |
| 2014/0294385 A1 | 10/2014 | Khotimsky et al. | | |
| 2021/0092668 A1* | 3/2021 | Zaus | ............... | H04W 48/02 |

FOREIGN PATENT DOCUMENTS

| | | |
|---|---|---|
| GN | 101577584 A | 11/2009 |
| JP | 64-13847 A | 1/1989 |
| JP | 09-153858 A | 6/1997 |
| JP | 2008-283324 A | 11/2008 |
| JP | 2009-065558 A | 3/2009 |
| JP | 2010-219878 A | 9/2010 |
| JP | 2014-171079 A | 9/2014 |
| JP | 2016-010074 A | 1/2016 |
| WO | 2014/086036 A1 | 6/2014 |

OTHER PUBLICATIONS

International Search Report for PCT/JP2018/016720 dated Jul. 10, 2018 [PCT/ISA/210].
Extended European Search Report dated Feb. 25, 2019 issued by the European Patent Office in counterpart application No. 18780014.9.

* cited by examiner

PON SYSTEM AND COMMUNICATION CONTROL METHOD

CROSS REFERENCE TO RELATED APPLICATIONS

This application is a National Stage of International Application No. PCT/JP2018/016720 filed Apr. 25, 2018, claiming priority based on Japanese Patent Application No. 2017-114078 filed Jun. 9, 2017, the disclosure of which is incorporated herein in its entirety by reference.

TECHNICAL FIELD

The present invention relates to a PON system and a communication control method.

BACKGROUND ART

A PON (Passive Optical Network) system is an example of optical access systems for implementing FTTH (Fiber To The Home) services. The PON system includes an OLT (Optical Line Terminal), which is a station end device installed at a central control station, and a plurality of ONUs (Optical Network Units), which are subscriber end devices installed at subscribers' premises.

In the PON system, a plurality of ONUs are connected to one OLT. One optical fiber cable that is laid from the OLT is shared by the plurality of ONUs through an optical splitter that splits and multiplexes optical signals.

Because one optical fiber cable between the OLT and the optical splitter is shared by the plurality of ONUs in the PON system, it is necessary to prevent the collision of optical signals output from the respective ONUs in the upstream from the ONUs to the OLT. Therefore, the OLT controls the output timing of optical signals from the respective ONUs by time-division multiplexing.

When a given ONU enters a continuous emission state due to a failure or the like in the PON system, an optical signal from this ONU in the continuous emission state overlaps optical signals from the other ONUs, which hinders the communication of the other ONUs. In view of this, optical communication systems that attempt recovery from a communication failure due to the continuous emission of an ONU have been proposed (Patent Literatures 1 and 2).

In the optical communication system disclosed in Patent Literature 1, an optical switch is placed in each of a plurality of optical transmission paths split by an optical branching device and respectively corresponding to a plurality of ONUs. When a communication failure occurs, the optical communication system disconnects the ONU from the optical branching device by sequentially switching the optical switches, and determines whether the communication failure is resolved or not. When it is determined that the communication failure is resolved, the disconnected state of the optical switch being disconnected is maintained.

In the PON system disclosed in Patent Literature 2, an optical detector is placed in an optical coupler. The optical detector detects an optical signal from each ONU and monitors whether a continuous emission anomaly is occurring or not.

CITATION LIST

Patent Literature

PTL1: Japanese Unexamined Patent Application Publication No. 2014-171079

PTL2: Japanese Unexamined Patent Application Publication No. 2010-219878

PTL3: Japanese Unexamined Patent Application Publication No. H1-13847

SUMMARY OF INVENTION

Technical Problem

In the event of an emergency, a person typically makes an emergency call to an institution such as a police station or a fire station by a terminal device such as a telephone terminal. Patent Literature 3 discloses an emergency reporting device that, when a subscriber line is in use in the event of an emergency, forcibly disconnects the subscriber line and enables the origination of an emergency call from the emergency reporting device.

As described above, when a given ONU enters a continuous emission state in the PON system, the optical fiber cable is occupied by the ONU in the continuous emission state, which hinders the other ONUs from originating an emergency call. Although Patent Literatures 1 and 2 disclose recovery from a communication failure due to the continuous emission of an ONU, they disclose nothing about making an emergency call from a terminal device in the event of a continuous emission anomaly. It is thus desirable to ensure the origination of an emergency call from a terminal device when a communication failure due to the continuous emission of an ONU occurs in a PON system.

Solution to Problem

A PON system according to one aspect of the present invention is a PON (Passive Optical Network) system including an OLT (Optical Line Terminal) and a plurality of ONUs (Optical Network Units) connected to the OLT through an optical branching device, where data is transmitted from the plurality of ONUs to the OLT by time-division multiplexing, wherein at least one first ONU among the plurality of ONUs includes an emergency call detection means for detecting an emergency call request from a terminal device connected to the first ONU, and an emergency call origination control means for outputting, to the optical branching device, a disconnection request for disconnecting an ONU other than the first ONU from the OLT when the emergency call request is detected by the emergency call detection means and connection of the first ONU to the OLT is not established, and the optical branching device includes an optical line control means for disconnecting the ONU other than the first ONU from the OLT in response to the disconnection request from the emergency call origination control means.

A communication control method according to one aspect of the present invention is a communication control method in a PON (Passive Optical Network) system including an OLT (Optical Line Terminal) and a plurality of ONUs (Optical Network Units) connected to the OLT through an optical branching device, where data is transmitted from the plurality of ONUs to the OLT by time-division multiplexing, the method including detecting, by at least one first ONU among the plurality of ONUs, an emergency call request from a terminal device connected to the first ONU, outputting, to the optical branching device, a disconnection request for disconnecting an ONU other than the first ONU from the OLT when the emergency call request is detected and connection of the first ONU to the OLT is not established, and disconnecting, by the optical branching device, the ONU other than the first ONU from the OLT in response to the disconnection request.

Advantageous Effects of Invention

According to an embodiment, it is possible to ensure the origination of an emergency call from a terminal device even when a communication failure due to the continuous emission of an ONU occurs in a PON system.

DESCRIPTION OF EMBODIMENTS

Embodiments of the present invention are described hereinafter with reference to the drawings.

The present invention relates to a PON (Passive Optical Network) system and a communication control method. The PON system is one of optical access systems that connect a central control station and subscribers' premises through optical fiber cables. In the PON system, an optical splitter that splits and multiplexes optical signals is placed in an optical transmission path being the optical fiber cable. The optical splitter splits the optical transmission path, so that a plurality of ONUs (Optical Network Units), which are terminating devices at the subscriber end are accommodated per OLT (Optical Line Terminal), which is a terminating device at the station end.

Figure 6:
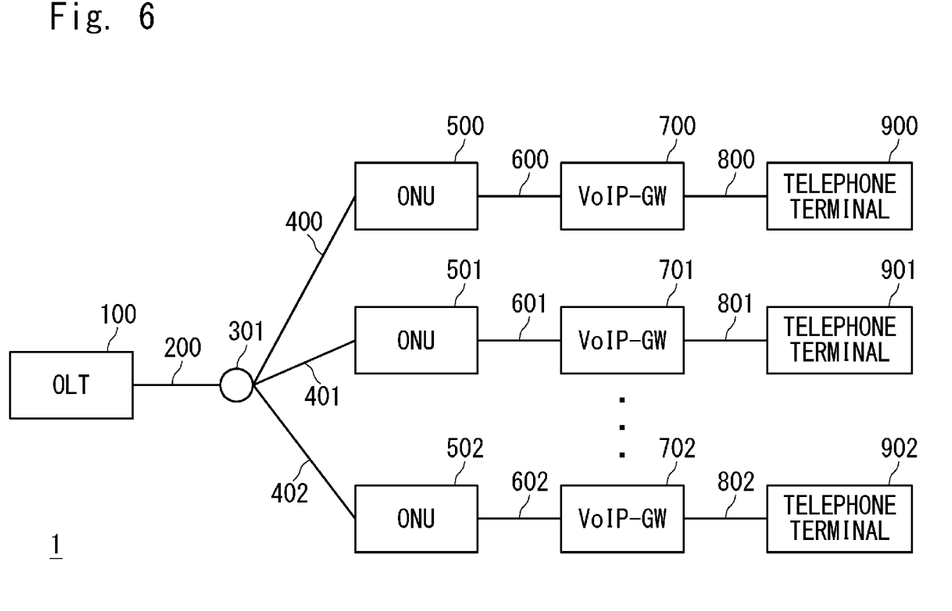
FIG. 6 is a view showing the configuration of a PON system according to a comparative example.

Prior to describing embodiments, a problem of a PON system according to a comparative example is described with reference to FIG. 6. FIG. 6 shows an example in which three ONUs 500 to 502 are connected to one OLT 100. As shown in FIG. 6, a PON system 1 includes an OLT 100, an optical fiber cable 200, an optical splitter 301, optical fiber cables 400 to 402, ONUs 500 to 502, LAN (Local Area Network) cables 600 to 602, VoIP-GW (Voice over Internet Protocol-gateway) 700 to 702, telephone lines 800 to 802, and telephone terminals 900 to 902.

The OLT 100 installed at a central control station is connected to the optical splitter 301 installed at a telephone pole or the like through the optical fiber cable 200. The optical splitter 301 splits an optical line for connection to the plurality of ONUs 500 to 502, which are subscriber end devices installed at the subscribers' premises through the optical fiber cables 400 to 402, respectively.

The VoIP-GW 700 to 702 having a VoIP (Voice over Internet protocol) feature are connected to the ONUs 500 to 502 through the LAN cables 600 to 602, respectively. The VoIP-GW 700 to 702 are also connected to the telephone terminals 900 to 902 through the telephone lines 800 to 802, respectively. In this manner, the PON system is a P2MP (Point to Multi Point) system, which secures an economic advantage by grouping optical lines of nearby subscribers into a bundle and sharing an optical transmission path and an OLT.

Each of the ONUs 500 to 502 outputs an optical signal only at the timing and during the period determined by an instruction from the OLT 100, so that the optical signals output from the ONUs 500 to 502 do not collide with each other in the shared optical fiber cable 200. A stable communication environment is thereby guaranteed for all lines in the same PON system. Note that, although the example in FIG. 6 shows a typical form of service with three optical lines, the number of lines and the device configuration are not limited thereto.

If some failure occurs in any one of the ONUs 500 to 502 in this PON system, it becomes out of control of the OLT 100, and the failed one of the ONUs 500 to 502 outputs an optical signal with no control in some cases. When a certain ONU enters the continuous emission state and the output of an optical signal becomes uncontrollable, the optical signal collides with optical signals output from the other ONUs in an optical fiber cable sharing section, causing a communication failure and failing to maintain the PON link of those lines.

When the PON link fails to be maintained due to such a problem, a telephone service becomes unavailable. Since the telephone service is shifting from an analog line to an optical line, it is particularly critical that an emergency call cannot be made from the telephone terminals 900 to 902 to an institution such as a police station or a fire station in the event of an emergency.

In an embodiment, even when a certain ONU enters the continuous emission state due to a failure and the communication of the ONUs in an optical fiber cable sharing section is disconnected in a telephone service through a PON system, it is possible to make an emergency call from the other ONUs whose communication is disconnected.

GE-PON (Gigabit Ethernet (registered trademark)-Passive Optical Network) standardized by IEEE (The Institute of Electrical and Electronics Engineers, Inc.) 802.3ah, 10G-EPON (10 Gigabit-Ethernet Passive Optical Network) and the like, for example, can be employed as the PON system. Fundamental description of such PON systems is omitted, and only the characteristic structures in this embodiment are described hereinafter.

First Embodiment

Figure 1:
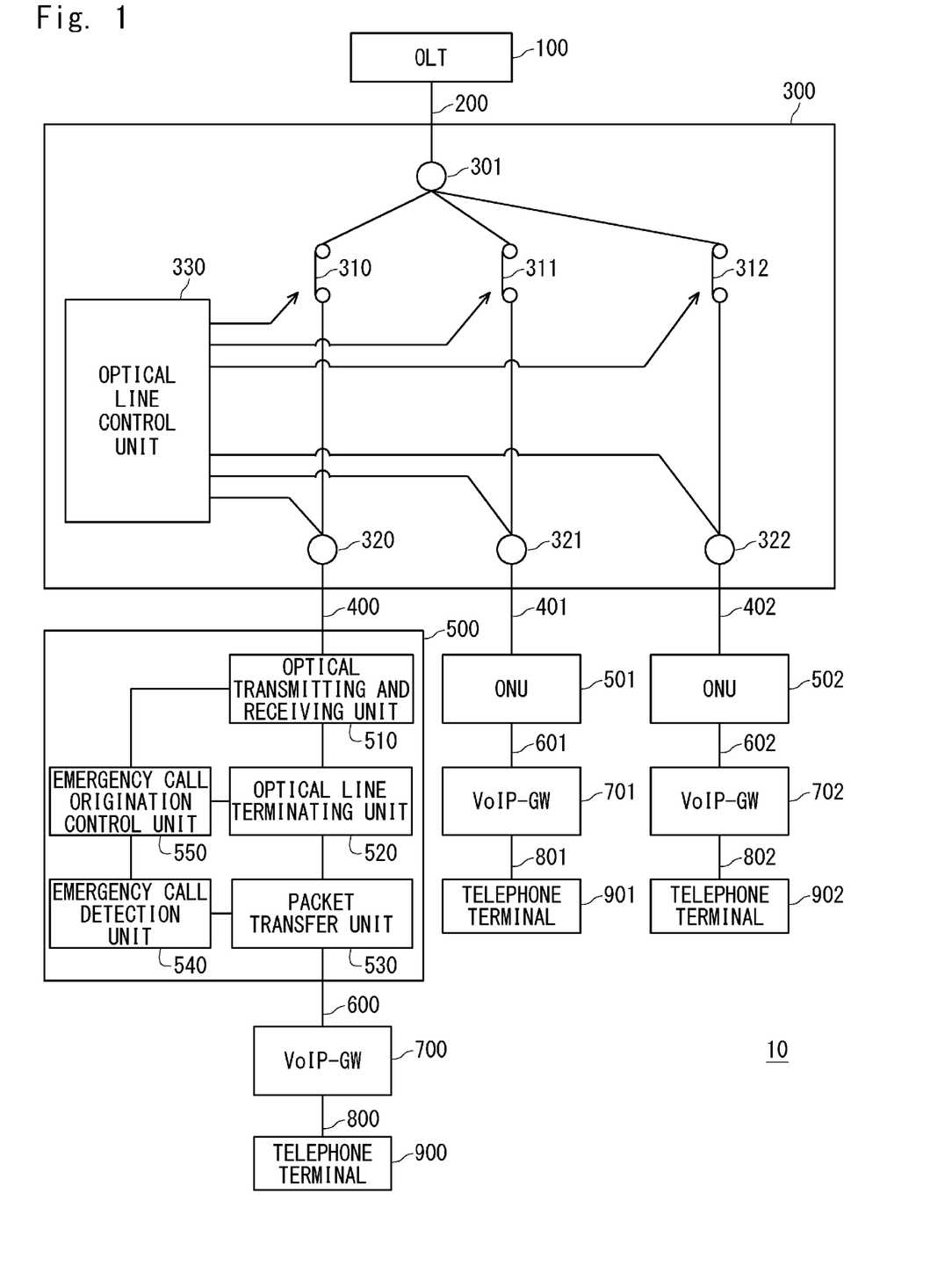
FIG. 1 is a view showing the configuration of a PON system according to a first embodiment.

FIG. 1 is a view showing the configuration of a PON system 10 according to a first embodiment. As shown in FIG. 1, the PON system 10 includes an OLT 100, an optical fiber cable 200, an optical branching device 300, optical fiber cables 400 to 402, ONUs 500 to 502, LAN cables 600 to 602, VoIP-GW 700 to 702, telephone lines 800 to 802, and telephone terminals 900 to 902. Note that, although the example in FIG. 1 shows a typical form of telephone and data transfer services with three optical lines, the number of lines, and the associated device configuration and the form of services are not limited thereto. In FIG. 1, the same elements as in FIG. 6 are denoted by the same reference symbols.

The OLT 100 is a terminating device at the telecommunications carrier end in the PON system 10. The ONUs 500 to 502 are terminating devices installed at the subscribers' premises in the PON system 10. The optical line is composed of the optical fiber cable 200 and the optical fiber cable 400. A subscriber can use the optical line provided by the telecommunications carrier by contract.

The optical branching device 300 has one optical IF (interface) on the upper side and has a plurality of optical IFs on the lower side. The optical branching device 300 has a function of splitting an optical line into a plurality of lines. The OLT 100 that is a terminating device at the telecommunications carrier end and controls the entire PON system 10 is connected to the optical IF on the upper side of the optical branching device 300 through the optical fiber cable 200. Further, the ONUs 500 to 502 are connected to the plurality of optical IFs on the lower side of the optical branching device 300 through the optical fiber cables 400 to 402, respectively.

Each of the ONUs 500 to 502 terminates the optical line and conducts conversion between optical signals and electrical signals. Each of the ONUs 500 to 502 has an optical IF on the upper side and has an electrical IF on the lower side. The optical branching device 300 is connected to the optical IFs on the upper side of the ONUs 500 to 502 through the optical fiber cables 400 to 402, respectively.

The optical signal transmitted from the OLT 100 passes through the optical fiber cable 200, is split by the optical branching device 300, and enters the ONUs 500 to 502. On the other hand, the optical signals transmitted from the ONUs 500 to 502 are combined by the optical branching device 300, pass through the optical fiber cable 200 and are then transmitted to the OLT 100.

The VoIP-GW 700 to 702 are connected to the ONUs 500 to 502 through the LAN cables 600 to 602, respectively. Each of the VoIP-GW 700 to 702 has a function of routing IP (Internet Protocol) packets and conducting conversion between IP packets and audio data. Each of the VoIP-GW 700 to 702 has an electrical IF on the upper side and has a telephone line IF on the lower side. The LAN cables 600 to 602 are connected to the electrical IFs on the upper side of the VoIP-GW 700 to 702, respectively. The telephone terminals 900 to 902 are connected to the telephone line IFs on the lower side of the VoIP-GW 700 to 702 through the telephone lines 800 to 802, respectively.

The VoIP-GW 700 to 702 are placed at the boundary between a telephone network and an IP network. The VoIP-GW 700 to 702 convert analog audio data input from the telephone lines 800 to 802 into digital audio data, divide the digital audio data into IP packets and transmit the IP packets to the ONUs 500 to 502 through the LAN cables 600 to 602, respectively. Further, the VoIP-GW 700 to 702 reconstruct IP packets received from the ONUs 500 to 502 into analog audio data, and transmit the analog audio data to the telephone terminals 900 to 902 through the telephone lines 800 to 802, respectively. The compression and decompression of digital audio data are performed by the VoIP-GW 700 to 702.

The configuration and the function of the optical branching device 300 are described in detail hereinafter. The optical branching device 300 is a multifunction splitter that includes an optical splitter 301, optical line switching units 310 to 312, upstream signal branching units 320 to 322, and an optical line control unit 330. An IF on the upper side of the optical splitter 301 is connected to the OLT 100 through the optical fiber cable 200, and a plurality of IFs on the lower side of the optical splitter 301 are connected to the optical line switching units 310 to 312, respectively.

The optical splitter 301 splits the optical transmission path being the optical fiber cable 200 into three optical transmission paths. In other words, the optical splitter 301 forms three optical lines. The optical line switching units 310 to 312 are respectively connected to the three optical transmission paths split by the optical splitter 301. The optical splitter 301 distributes and transfers a downstream signal from the OLT 100 to the plurality of optical line switching units 310 to 312.

Further, the optical splitter 301 combines upstream signals from the ONUs 500 to 502 and transfers them to the OLT 100. In order to prevent the upstream signals from the ONUs 500 to 502 from colliding with each other after being combined by the optical splitter 301, the OLT 100 calculates the time to start transmitting data accumulated in a buffer of each of the ONUs 500 to 502 and the amount of data allowed to be transmitted based on a control frame transmitted from each of the ONUs 500 to 502. The OLT 100 transmits the control frame to which an instruction signal is inserted to the ONUs 500 to 502 through the optical fiber cable 200 and the optical branching device 300.

The optical line switching units 310 to 312 switch between connection and disconnection of the three optical lines, respectively. IFs on the upper side of the optical line switching units 310 to 312 are connected to the optical splitter 301, and IFs on the lower side of the optical line switching units 310 to 312 are connected to the upstream signal branching units 320 to 322, respectively.

Each of the upstream signal branching units 320 to 322 has two IFs on the upper side and one IF on the lower side. One IFs on the upper side of the upstream signal branching units 320 to 322 are connected to the optical line control unit 330, and the other IFs on the upper side are connected to the optical line switching units 310 to 312, respectively. The IFs on the lower side of the upstream signal branching units 320 to 322 are connected to the ONUs 500 to 502 through the optical fiber cables 400 to 402, respectively.

The upstream signal branching units 320 to 322 transfer downstream signals from the optical line switching units 310 to 312 to the ONUs 500 to 502, respectively. Further, the upstream signal branching units 320 to 322 split and transfer upstream signals from the ONUs 500 to 502 to the optical line control unit 330 and the optical line switching units 310 to 312. In other words, the upstream signal branching units 320 to 322 distribute the upstream signals from the ONUs 500 to 502 to each of the optical line control unit 330 and the optical splitter 301.

The optical line control unit 330 detects a request concerning optical line control from the upstream signal from each of the upstream signal branching units 320 to 322 and controls each of the optical line switching units 310 to 312 based on the request, and thereby connects or disconnects each optical line.

The configuration and the function of the ONUs 500 to 502 are described in detail hereinafter. The ONUs 500 to 502 have the same configuration. The ONU 500 is described hereinafter as a representative of the ONUs. The ONU 500 includes an optical transmitting and receiving unit 510, an optical line terminating unit 520, a packet transfer unit 530, an emergency call detection unit 540, and an emergency call origination control unit 550.

The optical transmitting and receiving unit 510 is connected to the upstream signal branching unit 320 in the optical branching device 300 through the optical fiber cable 400. Further, the optical transmitting and receiving unit 510 is connected to each of the optical line terminating unit 520 and the emergency call origination control unit 550. The optical transmitting and receiving unit 510 converts an optical signal received from the OLT 100 into an electrical signal and demodulates data. Further, the optical transmitting and receiving unit 510 modulates data input from the optical line terminating unit 520 to an optical signal.

The optical line terminating unit 520 is connected to each of the optical transmitting and receiving unit 510, the packet transfer unit 530 and the emergency call origination control unit 550. The optical line terminating unit 520 maintains the PON link with the OLT 100, transmits an upstream packet to the optical transmitting and receiving unit 510 according to an instruction from the OLT 100, and controls the emission timing of the optical transmitting and receiving unit 510.

The packet transfer unit 530 is connected to each of the optical line terminating unit 520 and the emergency call detection unit 540. Further, the packet transfer unit 530 is connected to the VoIP-GW 700 through the LAN cable 600. The packet transfer unit 530 transfers a downstream packet to the VoIP-GW 700. Further, the packet transfer unit 530 transfers an upstream packet to the optical line terminating unit 520.

An upstream packet of audio data that is transmitted from the telephone terminal 900 and turned into IP by the VoIP-GW 700 contains call receiver information. The packet transfer unit 530 duplicates only the packet containing the call receiver information of audio data in the upstream packet and transfers it to the emergency call detection unit 540.

The emergency call detection unit 540 is connected to each of the packet transfer unit 530 and the emergency call origination control unit 550. The emergency call detection unit 540 receives the packet containing the call receiver information of audio data from the packet transfer unit 530. The emergency call detection unit 540 analyzes this packet and detects the call receiver information. As the call receiver information, the emergency call detection unit 540 can detect a dial number of the call receiver, for example. Then, the emergency call detection unit 540 determines whether the call receiver information indicates an emergency call (number 110, 119 etc.) to an institution such as a police station or a fire station. When the call receiver information indicates an emergency call, the emergency call detection unit 540 sends, to the emergency call origination control unit 550, an emergency call request indicating that an end user needs to make an emergency call.

The emergency call origination control unit 550 is connected to each of the optical transmitting and receiving unit 510, the optical line terminating unit 520 and the emergency call detection unit 540. The emergency call origination control unit 550 acquires information about the PON link from the optical line terminating unit 520. Further, the emergency call origination control unit 550 receives, from the emergency call detection unit 540, an emergency call request indicating the origination of an emergency call.

When the emergency call origination control unit 550 receives an emergency call request indicating the origination of an emergency call from the emergency call detection unit 540, it acquires information about the optical lines from the optical line terminating unit 520. When any one of the other ONUs 501 and 502 is in the continuous emission state, the PON link is not established in spite of receiving a downstream signal. When it is detected that the PON link is not established in spite of receiving a downstream signal, the emergency call origination control unit 550 requests the optical branching device 300 to disconnect the other optical lines.

Specifically, the emergency call origination control unit 550 outputs a disconnection request for disconnecting the ONUs 501 and 502, which are the ONUs other than the ONU 500, from the OLT 100 when a downstream signal to the ONU 500 is received and the PON link of the ONU 500 is disconnected. At this time, the emergency call origination control unit 550 temporarily permits the optical transmitting and receiving unit 510 to perform optical transmission and spontaneously transmits the disconnection request to the optical line control unit 330 without conforming to the protocol of the PON system that transmits an upstream signal under control of the OLT 100.

When the optical line control unit 330 in the optical branching device 300 detects the disconnection request for disconnecting the optical lines other than the optical line of a sender from the upstream signal received through the upstream signal branching unit 320, it disconnects the optical lines other than the optical line of the sender. Specifically, the optical line control unit 330 opens the optical line switching units 311 and 312 that connect, to the OLT 100, the ONUs 501 and 502, which are the ONUs other than the ONU 500 that originates an emergency call. It is thereby possible to temporarily establish a P2P (Pint to Point) connection between the ONU 500 and the OLT 100.

As described above, even when, due to the continuous emission of a specific ONU, the communication of the other optical lines in the same PON system is disconnected, the other optical lines excluding the optical line that originates an emergency call are physically disconnected to thereby restore the communication environment of this optical line and enable making an emergency call.

Further, not only the ONU 500 but also the ONUs 501 and 502 include the emergency call detection unit and the emergency call origination control unit. Therefore, even when two or more emergency call requests are made sequentially from the telephone terminal 901 connected to the ONU 501 or the telephone terminal 902 connected to the ONU 502, it is possible to temporarily disconnect the optical lines excluding the optical line that originates an emergency call and thereby establish connection between the ONU 501 and the OLT 100 and between the ONU 502 and the OLT 100.

Figure 2:
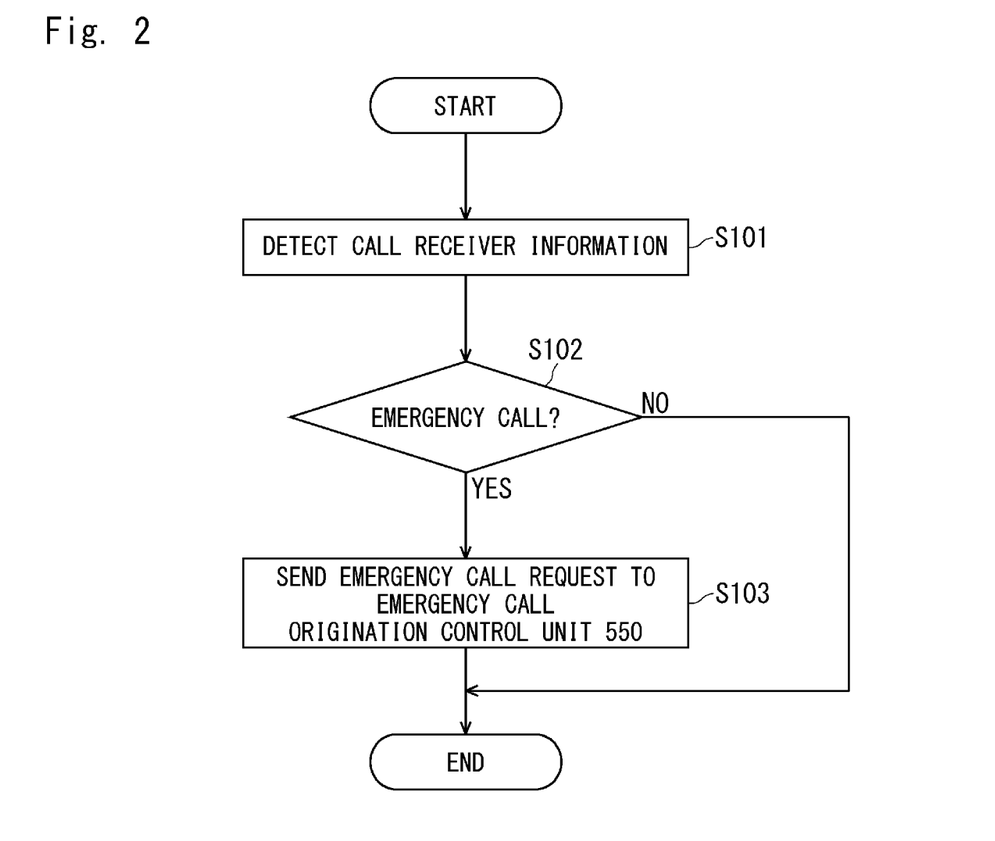
FIG. 2 is a flowchart illustrating a communication control method of the PON system according to the first embodiment.
Figure 3:
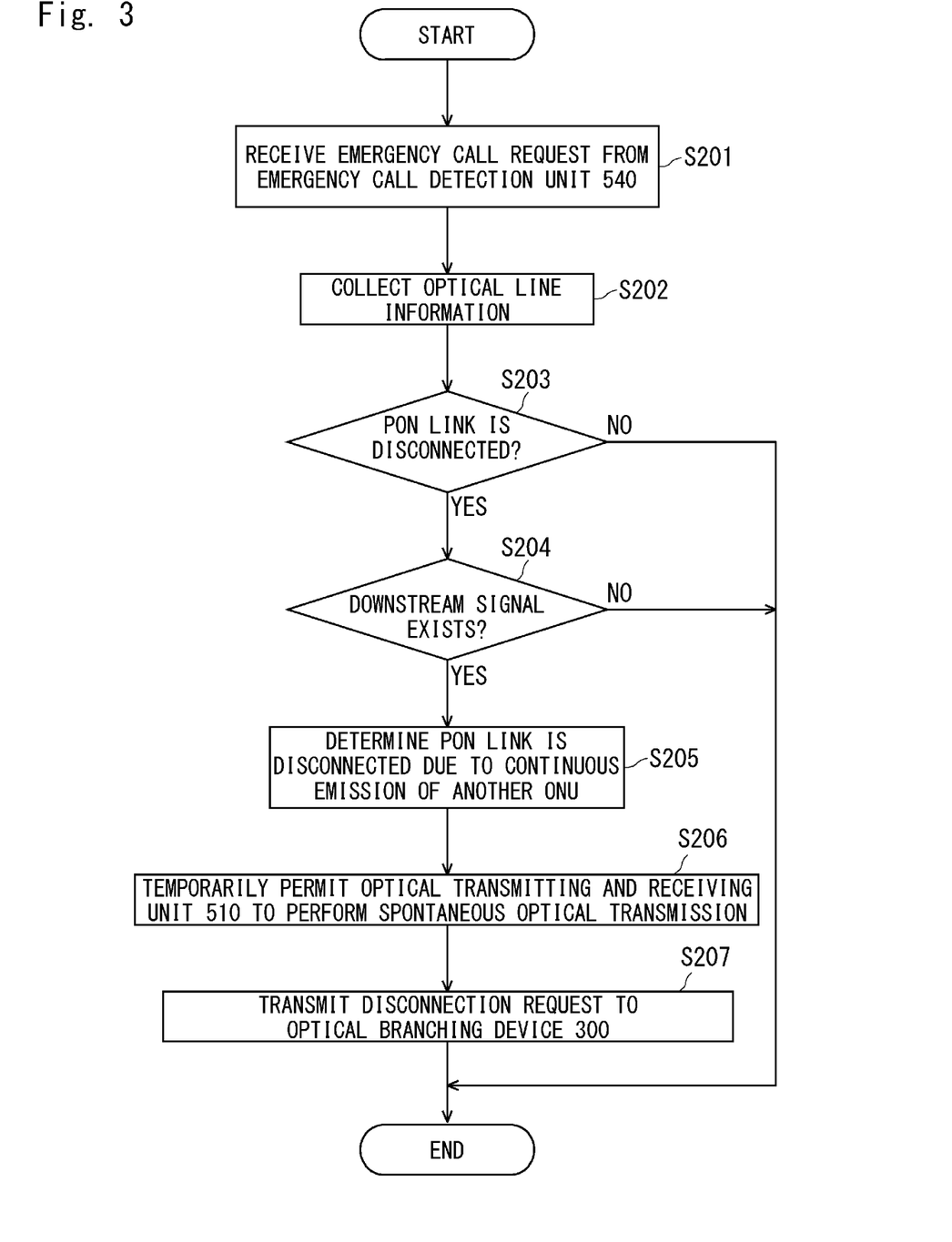
FIG. 3 is a flowchart illustrating the communication control method of the PON system according to the first embodiment.
Figure 4:
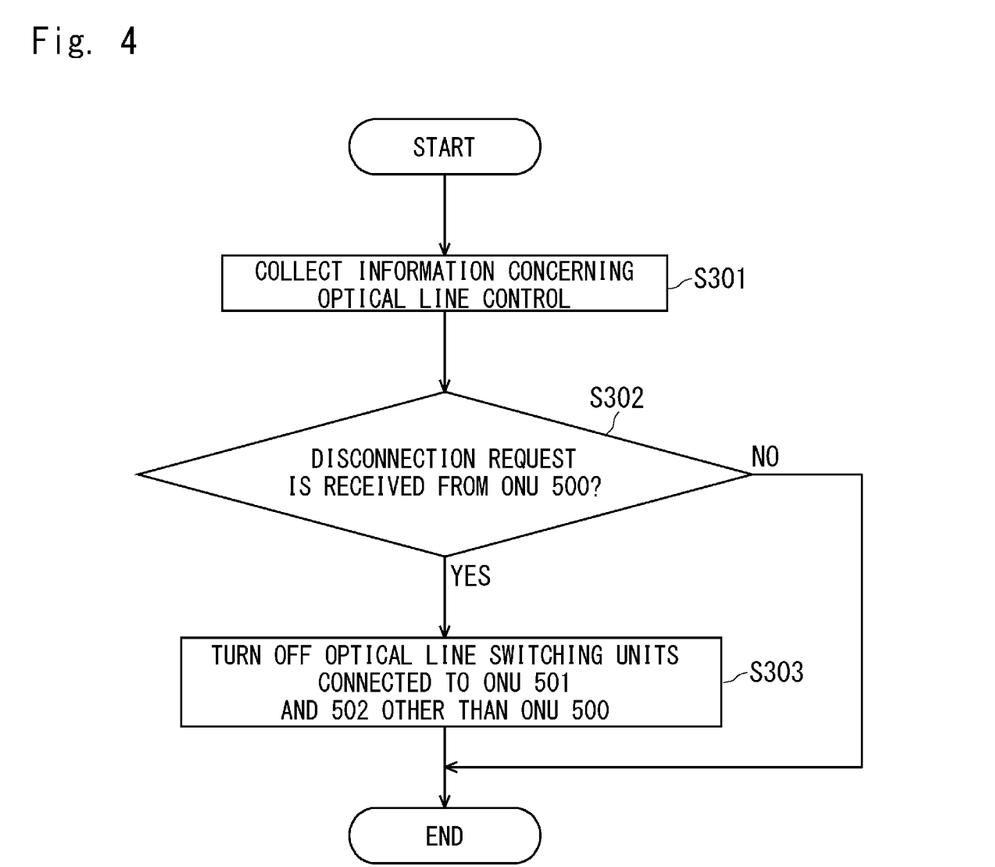
FIG. 4 is a flowchart illustrating the communication control method of the PON system according to the first embodiment.

A communication control method of the PON system 10 according to the first embodiment is described hereinafter with reference to FIGS. 2, 3 and 4. An example where an emergency call is originated by the ONU 500 is described below. First, the operation of the emergency call detection unit 540 in the ONU 500 is described first with reference to FIG. 2. FIG. 2 is a flowchart illustrating the operation of the emergency call detection unit 540.

As shown in FIG. 2, the emergency call detection unit 540 analyzes a packet containing call receiver information of audio data received from the VoIP-GW 700 through the packet transfer unit 530 and detects the call receiver information (Step S101). As the call receiver information, a dial number of the call receiver is detected, for example.

Then, the emergency call detection unit 540 determines whether the call receiver information indicates an emergency call or not (Step S102). When the call receiver information does not indicate an emergency call (No in Step S102), the emergency call detection unit 540 ends the process. When, on the other hand, the call receiver information indicates an emergency call (Yes in Step S102), the emergency call detection unit 540 sends, to the emergency call origination control unit 550, an emergency call request indicating that it is necessary to originate an emergency call (Step S103).

The operation of the emergency call origination control unit 550 in the ONU 500 is described next with reference to FIG. 3. FIG. 3 is a flowchart illustrating the operation of the emergency call origination control unit 550. As shown in FIG. 3, when the emergency call origination control unit 550 receives the emergency call request from the emergency call detection unit 540 (Step S201), it collects information of the optical lines through the optical line terminating unit 520 (Step S202), and checks the state of the optical lines. Based on the optical line information, the emergency call origination control unit 550 determines whether the PON link is disconnected or not (Step S203).

When the PON link is established, the communication by the ONU 500 can be carried out normally. When the PON link is not disconnected (No in Step S203), the emergency call origination control unit 550 ends the process. On the other hand, when the PON link is not established, the communication by the ONU 500 cannot be carried out at this point of time. When the PON link is disconnected (Yes in Step S203), it is determined whether there is a downstream signal or not (Step S204).

When a downstream signal is not received (No in Step S204), it is determined that there is a defect in the OLT 100 or in the optical transmission path between the OLT 100 and the ONU 500, and the process ends. When, on the other hand, a downstream signal is received (Yes in Step S204), the OLT 100 and the optical transmission path between the OLT 100 and the ONU 500 are normal. A possible situation in this case is that any one of the other ONUs 501 and 502 is in the continuous emission state and transmits an optical signal at time other than specified time, and thereby the collision of upstream signals is occurring in the section of the optical fiber cable 200. The optical signal transmitted from the ONU 500 thereby cannot reach the OLT 100. Thus, in this case, the emergency call origination control unit 550 determines that the PON link is disconnected (Step S205).

In such a case, the emergency call origination control unit 550 controls the optical branching device 300 so as to enable the origination of an emergency call. To be specific, the emergency call origination control unit 550 first temporarily permits the optical transmitting and receiving unit 510 to spontaneously perform optical transmission (Step S206), so that optical transmission can be carried out. Further, the emergency call origination control unit 550 generates a disconnection request that requests the disconnection of optical lines other than the optical line which connects to the ONU 500, and spontaneously transmits the disconnection request to the optical line control unit 330 in the optical branching device 300 without conforming to the protocol of the PON system that transmits an upstream signal under control of the OLT 100 (Step S207).

Finally, the operation of the optical branching device 300 is described with reference to FIG. 4. FIG. 4 is a flowchart illustrating the operation of the optical branching device 300. As shown in FIG. 4, the optical line control unit 330 collects information concerning optical line control from a signal received through the upstream signal branching unit 320 (Step S301). Then, it is determined whether a disconnection request transmitted from the emergency call origination control unit 550 in the ONU 500 is received or not (Step S302). When the disconnection request is detected (Yes in Step S302), only the optical line switching unit 310 remains in the connected state, and the optical line switching units 311 to 312 connected to the other ONUs 501 to 502 are disconnected (Step S303). By the above operation, the PON link of the ONU 500 is established to enable the communication, which makes it possible to originate an emergency call from and speak on the telephone terminal 900.

As described above, according to the embodiment, the ONU can recognize an emergency call originated from an end user by analyzing an audio packet received from the VoIP-GW located on the downstream side. In the case where the ONU recognizes the origination of an emergency call, even if the communication through its line cannot be carried out due to the continuous emission of another ONU, it is possible to restore the line to ensure the origination of an emergency call by forcibly disconnecting the line of this ONU.

In this manner, because the ONU located at the line where an emergency call needs to be made determines the state of its line and carries out the processing to temporarily restore its line, the acquisition of the state of the other ONUs and the operation by the OLT and the other ONUs can be omitted.

Second Embodiment

Figure 5:
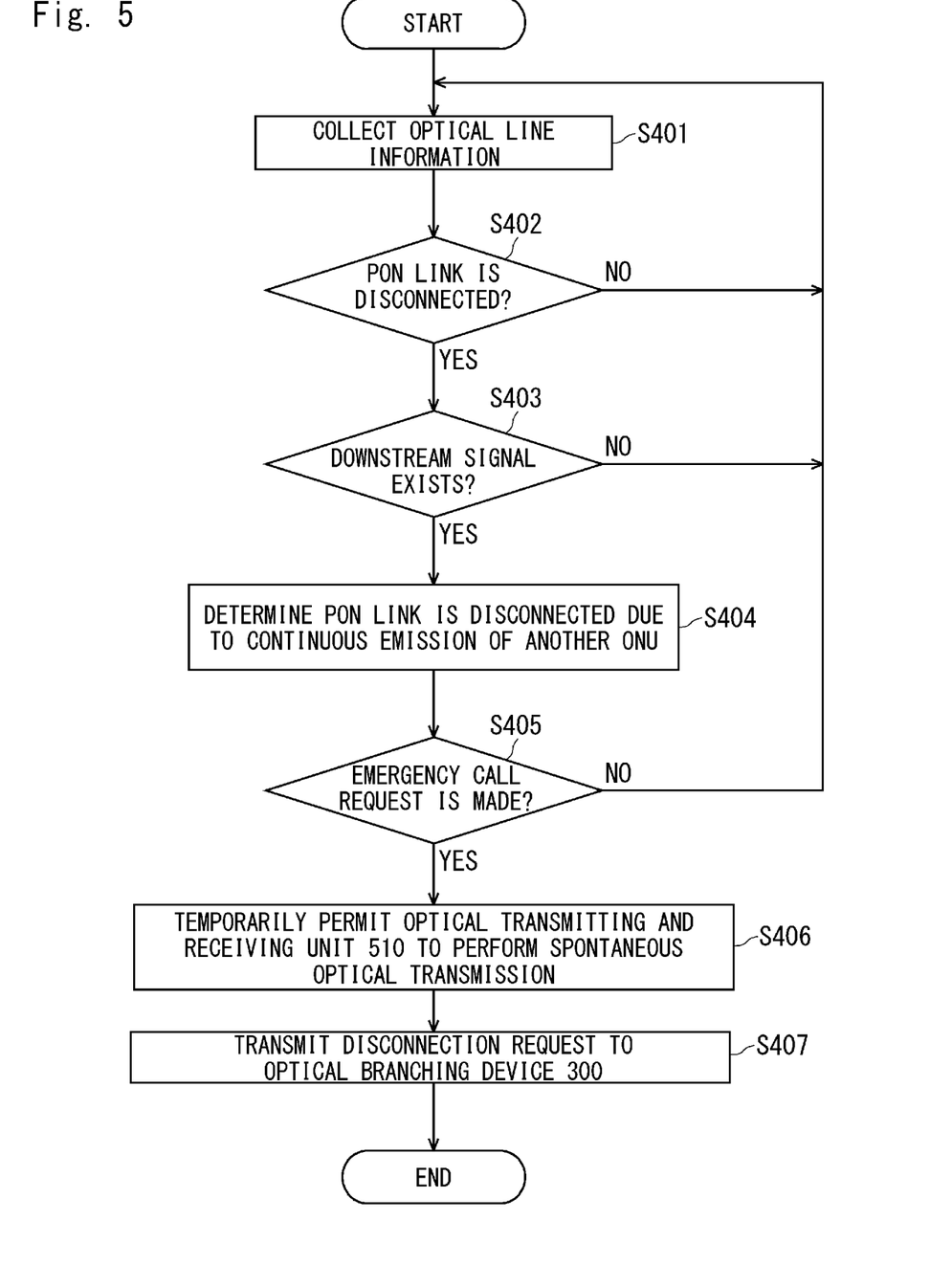
FIG. 5 is a flowchart illustrating a communication control method of a PON system according to a second embodiment.

A communication control method according to a second embodiment is described hereinafter with reference to FIG. 5. FIG. 5 is a flowchart illustrating the operation of the emergency call origination control unit 550. In the second embodiment, the ONU 500 monitors the state of the optical lines at regular intervals and determines in advance whether or not the PON link is disconnected due to the continuous emission. When the emergency call origination control unit 550 receives an emergency call request indicating the origination of an emergency call, it requests the optical branching device 300 to disconnect the other lines immediately.

Note that the configuration of a PON system that performs the communication control method according to the second embodiment is the same as the configuration of the PON system 10 shown in FIG. 1 and not redundantly described. Further, the operations of the emergency call detection unit 540 and the optical branching device 300 are the same as those in the first embodiment.

The emergency call detection unit 540 analyzes a packet containing call receiver information of audio data received through the packet transfer unit 530 and detects the call receiver information, just like in the first embodiment. When the call receiver information indicates an emergency call, the emergency call detection unit 540 sends, to the emergency call origination control unit 550, an emergency call request indicating that it is necessary to originate an emergency call.

As shown in FIG. 5, the emergency call origination control unit 550 collects information of the optical lines through the optical line terminating unit 520 regardless of notification from the emergency call detection unit 540 (Step S401), and monitors the optical line terminating unit 520 at regular intervals. Then, based on the optical line information, the emergency call origination control unit 550 determines whether the PON link is disconnected or not (Step S402).

When the PON link is established (No in Step S203), the emergency call origination control unit 550 returns to Step S401 and continues to monitor the state of the optical lines. On the other hand, when the PON link is not established (Yes in Step S402), it is determined whether there is a downstream signal or not (Step S403).

When a downstream signal is not received (No in Step S403), the emergency call origination control unit 550 determines that there is a defect in the OLT 100 or in the optical transmission path between the OLT 100 and the ONU 500, and returns to Step S401 and continues to monitor the state of the optical lines. When, on the other hand, a downstream signal is received (Yes in Step S403), the emergency call origination control unit 550 determines that the PON link is disconnected due to the continuous emission of the other ONU 501 or 502 (Step S404).

After determining that it is an optical line defect due to the continuous emission of the other ONU 501 or 502, the emergency call origination control unit 550 checks whether there is an emergency call request from the emergency call detection unit 540 (Step S405). When an emergency call request is not received (No in Step S405), the emergency call origination control unit 550 continues to monitor the state of the optical lines.

On the other hand, when an emergency call request is received (Yes in Step S405), the emergency call origination control unit 550 temporarily permits the optical transmitting and receiving unit 510 to spontaneously perform optical transmission, so that optical transmission can be carried out (Step S406). Further, the emergency call origination control unit 550 generates a disconnection request that requests the disconnection of optical lines other than the optical line which connects to the ONU 500, and transmits the disconnection request to the optical line control unit 330 in the optical branching device 300 (Step S407).

As described above, according to this embodiment, even when a failure due to the continuous emission occurs in a specific ONU and the communication of the other optical lines in the same PON system is disconnected, all the lines excluding the line where an emergency call needs to be made are temporarily disconnected to thereby restore the communication environment of this line and enable making an emergency call.

It should be noted that the present invention is not limited to the above-described exemplary embodiments and may be varied in many ways within the scope of the present invention.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 PON SYSTEM
100 OLT
200 OPTICAL FIBER CABLE
300 OPTICAL BRANCHING DEVICE
301 OPTICAL SPLITTER
310 to 312 OPTICAL LINE SWITCHING UNIT
320 to 322 UPSTREAM SIGNAL BRANCHING UNIT
330 OPTICAL LINE CONTROL UNIT
400 to 402 OPTICAL FIBER CABLE
500 to 502 ONU
510 OPTICAL TRANSMITTING AND RECEIVING UNIT
520 OPTICAL LINE TERMINATING UNIT
530 PACKET TRANSFER UNIT
540 EMERGENCY CALL DETECTION UNIT
550 EMERGENCY CALL ORIGINATION CONTROL UNIT
600 to 602 LAN CABLE
700 to 702 VoIP-GW
800 to 802 TELEPHONE LINE
900 to 902 TELEPHONE TERMINAL

The invention claimed is:

1. A PON (Passive Optical Network) system comprising an OLT (Optical Line Terminal) and a plurality of ONUs (Optical Network Units) connected to the OLT through an optical branching device, where data is transmitted from the plurality of ONUs to the OLT by time-division multiplexing, wherein:
   at least one first ONU among the plurality of ONUs includes:
      an emergency call detection unit configured to detect an emergency call request from a terminal device connected to the first ONU; and
      an emergency call origination control unit configured to output, to the optical branching device, a disconnection request for disconnecting all ONUs other than the first ONU from the OLT if the emergency call request is detected by the emergency call detection unit and connection of the first ONU to the OLT is not established, and
   the optical branching device includes:
      an optical splitter configured to split a downstream signal from the OLT into a plurality of optical transmission paths respectively corresponding to the plurality of ONUs, and perform time-division multiplexing of upstream signals from the plurality of ONUs to the OLT;
      a plurality of switches respectively placed on the plurality of optical transmission paths; and
      an optical line control unit configured to disconnect all ONUs other than the first ONU from the OLT in response to the disconnection request from the emergency call origination control unit, and
   wherein the optical line control unit is configured to control the plurality of switches to disconnect all ONUs other than the first ONU from the OLT and connect the first ONU to the OLT in response to the disconnection request.

2. The PON system according to claim 1, wherein the emergency call origination control unit is configured to output the disconnection request if connection of the first ONU to the OLT is not established and the first ONU receives a downstream signal from the OLT.

3. The PON system according to claim 2, wherein:
   the optical branching device further includes a branching unit configured to distribute an upstream signal from the first ONU to the optical line control unit and a first switch corresponding to the first ONU among the plurality of switches, and
   the optical line control unit is configured to receive the disconnection request through the branching-unit.

4. The PON system according to claim 2, wherein each of the plurality of ONUs includes the emergency call detection unit and the emergency call origination control unit.

5. The PON system according to claim 1, wherein:
   the optical branching device further includes a branching unit configured to distribute an upstream signal from the first ONU to the optical line control unit and a first switch corresponding to the first ONU among the plurality of switches, and
   the optical line control unit is configured to receive the disconnection request through the branching unit.

6. The PON system according to claim 5, wherein each of the plurality of ONUs includes the emergency call detection unit and the emergency call origination control unit.

7. The PON system according to claim 1, wherein each of the plurality of ONUs includes the emergency call detection unit and the emergency call origination control unit.

8. A communication control method in a PON (Passive Optical Network) system, the system including: an OLT (Optical Line Terminal) and a plurality of ONUs (Optical Network Units) connected to the OLT through an optical branching device, wherein data is transmitted from the plurality of ONUs to the OLT by time-division multiplexing, the method comprising:

detecting, by at least one first ONU among the plurality of ONUs, an emergency call request from a terminal device connected to the first ONU;

outputting, by the first ONU to the optical branching device, a disconnection request for disconnecting all ONUs other than the first ONU from the OLT if the emergency call request is detected and connection of the first ONU to the OLT is not established; and     disconnecting all ONUs other than the first ONU from the OLT and connecting the first ONU to the OLT, by the optical branching device, in response to the disconnection request;

wherein the optical branching device includes:

an optical splitter configured to split a downstream signal from the OLT into a plurality of optical transmission paths respectively corresponding to the plurality of ONUs, and perform time-division multiplexing of upstream signals from the plurality of ONUs to the OLT; and             a plurality of switches respectively placed on the plurality of optical transmission paths; and     wherein the disconnecting all ONUs other than the first ONU from the OLT and the connecting the first ONU to the OLT, by the optical branching device, in response to the disconnection request comprises controlling the plurality of switches to disconnect all ONUs other than the first ONU from the OLT and connect the first ONU to the OLT in response to the disconnection request.

9. The communication control method according to claim 8, wherein the disconnection request is output if connection of the first ONU to the OLT is not established and the first ONU receives a downstream signal from the OLT.

10. The communication control method according to claim 9, wherein:

whether the first ONU is connected to the OLT is determined in advance, and     the disconnection request is output if connection of the first ONU to the OLT is not established and the emergency call request is detected.

11. The communication control method according to claim 8, wherein:

whether the first ONU is connected to the OLT is determined in advance, and     the disconnection request is output if connection of the first ONU to the OLT is not established and the emergency call request is detected.

\* \* \* \* \*